United States Patent
Lee et al.

(10) Patent No.: US 10,324,924 B2
(45) Date of Patent: Jun. 18, 2019

(54) SYNCHRONIZING QUERY RESULT BETWEEN HETEROGENEOUS DATABASES

(71) Applicant: TmaxData Co., Ltd., Seongnam-si (KR)

(72) Inventors: Joo Hyun Lee, Namyangju-si (KR); Sang Young Park, Seongnam-si (KR); Yong Jae Lee, Seongnam-si (KR); Young Jae Choi, Seongnam-si (KR); Bong Chae Kang, Seoul (KR)

(73) Assignee: TmaxData Co., Ltd., Seongnam-si (KR)

( * ) Notice: Subject to any disclaimer, the term of this patent is extended or adjusted under 35 U.S.C. 154(b) by 570 days.

(21) Appl. No.: 15/073,299

(22) Filed: Mar. 17, 2016

(65) Prior Publication Data

US 2017/0249354 A1 Aug. 31, 2017

(30) Foreign Application Priority Data

Feb. 29, 2016 (KR) .......................... 10-2016-0024559

(51) Int. Cl.
*G06F 16/23* (2019.01)

(52) U.S. Cl.
CPC ...... *G06F 16/2393* (2019.01); *G06F 16/2358* (2019.01)

(58) Field of Classification Search
CPC .................................................. G06F 16/2393
USPC ......................................................... 707/635
See application file for complete search history.

(56) References Cited

U.S. PATENT DOCUMENTS

| | | | | | |
|---|---|---|---|---|---|
| 5,963,959 A | * | 10/1999 | Sun | ................... | G06F 17/30578 |
| 6,334,128 B1 | * | 12/2001 | Norcott | ............. | G06F 17/30383 |
| 6,339,769 B1 | * | 1/2002 | Cochrane | ........... | G06F 17/30457 |

(Continued)

FOREIGN PATENT DOCUMENTS

KR 10-2011-0139739 12/2011

OTHER PUBLICATIONS

Bello et al., Materialized Views in Oracle, Proceedings of the 24th VLDB Conference New York, USA 1998, pp. 659-664. (Year: 1998).*

(Continued)

*Primary Examiner* — Cheyne D Ly
(74) *Attorney, Agent, or Firm* — McDermott Will & Emery LLP

(57) ABSTRACT

According to an exemplary embodiment of the present invention, disclosed is a method for synchronizing query results between databases executed in a first database server. The method may include: determining synchronization of a materialized view present in a second database server which is remotely located from the first database server in which the materialized view refers to a master table present in the first database server and the first database server and the second database server are heterogeneous; generating a synchronization command to be transmitted to the second database server in response to determination of synchronization; and transmitting the generated synchronization command to the second database server to allow the second database server to synchronize the materialized view present in the second database server and the master table present in the first database server.

10 Claims, 7 Drawing Sheets

(56) References Cited

U.S. PATENT DOCUMENTS

| | | | | |
|---|---|---|---|---|
| 6,496,828 B1* | 12/2002 | Cochrane | .......... | G06F 17/30457 |
| | | | | 707/717 |
| 6,581,205 B1* | 6/2003 | Cochrane | ............ | G06F 16/2393 |
| | | | | 717/140 |
| 6,697,804 B1* | 2/2004 | Elsbernd | ........... | G06F 17/30575 |
| 7,392,248 B2* | 6/2008 | Bakalash | .......... | C03B 37/02718 |
| 2005/0235001 A1 | 10/2005 | Peleg | | |
| 2006/0122964 A1* | 6/2006 | Yu | ....................... | G06F 16/2393 |
| 2009/0018991 A1 | 1/2009 | Thiyagarajan | | |
| 2012/0011098 A1 | 1/2012 | Yamada | | |
| 2013/0332487 A1* | 12/2013 | Ramesh | .............. | G06F 16/2455 |
| | | | | 707/775 |
| 2014/0280029 A1 | 9/2014 | Ding | | |

OTHER PUBLICATIONS

Segev et al., Maintaining Materialized Views in Distributed Databases, IEEE, pp. 262-270. (Year: 1989).*

Maresh, J., Materialized Views in Action, Select Journal, pp. 33-38. (Year: 2005).*

Office Action dated Mar. 21, 2016, issued by the Korean Intellectual Property Office in KR 10-2016-0024559.

* cited by examiner

SYNCHRONIZING QUERY RESULT BETWEEN HETEROGENEOUS DATABASES

CROSS-REFERENCE TO RELATED APPLICATIONS

This application claims priority to and the benefit of Korean Patent Application No. 10-2016-0024559 filed in the Korean Intellectual Property Office on Feb. 29, 2016, the entire contents of which are incorporated herein by reference.

TECHNICAL FIELD

The present invention relates to a database management system (DBMS) and more particularly, to synchronization of a query result between heterogeneous databases using a remote materialized view.

BACKGROUND

Corporations have rapidly expanded businesses due to explosively increased data and various environments and platforms. As a new business environment has come, more efficient and flexible data service, information processing, and data management function are required. In accordance with such a change, a database for solving the problems of high performance, high availability, and expandability which become a basis for incorporating businesses is continuously studied.

In a database management system (DBMS), data may be stored in a data storage. In a relational database management system (RDBMS), the data storage may be referred to as a table. The table includes one or more rows and each of the one or more rows includes one or more columns.

When the database includes a large quantity of data, it may take a relatively long time to perform a query for retrieving data in which a user may be interested. When it takes a long time for the database to respond the query, it may adversely affect the performance of the database.

In this circumstance, it is desirable to restrict direct access of a column or a table which is frequently accessed by a large number of users. The problem may be solved by indirectly accessing the column or the table through a "view", rather than by directly accessing the column or the table. The "view" may refer to a virtual or logical table which is induced from one or more master tables, has a shape like the master table, but is not physically present. That is, when the view is executed, a result set of a defined query is generated in a memory and when a session ends, the result set disappears.

A materialized view may refer to a table which physically stores a result of a view query. The materialized view may bring the result from a table in which the query result is directly stored without separately performing the query in order to improve an execution speed of the query. That is, in the materialized view, since the result set of the query is stored in a table of a table space, data may be easily consistently updated at a low cost. Further, the materialized view may be used to cache a complex query or copy a specific table to another database.

When data of the master table which is referred by the materialized view is changed, in order to maintain consistency of the query result value, the changed data of the master table needs to be reflected to the materialized view (that is, a materialized view table or a container table).

Therefore, various studies on synchronization (that is, refresh) of the materialized view are continuously performed.

SUMMARY OF THE INVENTION

The present invention has been made in an effort to achieve synchronization of query results between heterogeneous databases using an efficient method.

The present invention has been made in an effort to further achieve fast refresh of a materialized view between heterogeneous databases which are not compatible with each other.

An exemplary embodiment of the present invention provides a method for synchronizing query results between databases executed in a first database server. The method may include: determining synchronization of a materialized view present in a second database server which is remotely located from the first database server in which the materialized view refers to a master table present in the first database server and the first database server and the second database server are heterogeneous; generating a synchronization command to be transmitted to the second database server in response to determination of synchronization; and transmitting the generated synchronization command to the second database server to allow the second database server to synchronize the materialized view present in the second database server and the master table present in the first database server.

Another exemplary embodiment of the present invention provides a method for synchronizing query results between databases executed in a second database server. The method may include: receiving a synchronization command from a first database server which is remotely located from the second database server in which there is a master table in the first database server, there is a materialized view which refers to the master table, in the second database server, and the first database server and the second database server are heterogeneous; and performing synchronization between the materialized view present in the second database server and the master table present in the first database server, in response to the received synchronization command.

Another exemplary embodiment of the present invention provides a first database server for synchronizing query results between databases. The server may include a synchronization determining module which is configured to determine synchronization of materialized view present in a second database server which is remotely located from the first database server, in which the materialized view refers to a master table present in the first database server and the first database server and the second database server are heterogeneous; a synchronization command generating module which is configured to generate a synchronization command to be transmitted to the second database server in response to determination of synchronization; and a communication module which is configured to transmit the generated synchronization command to the second database server to allow the second database server to synchronize the materialized view present in the second database server and the master table present in the first database server.

Another exemplary embodiment of the present invention provides a second database server for synchronizing query results between databases. The server may include a communication module which is configured to receive a synchronization command from a first database server which is remotely located from the second database server in which there is a master table in the first database server, there is a materialized view which refers to the master table, in the second database server, and the first database server and the second database server are heterogeneous; and a synchronizing module which is configured to perform synchronization between the materialized view present in the second database server and the master table present in the first database server, in response to the received synchronization command.

Another exemplary embodiment of the present invention provides a computer program stored in a computer readable medium including encoded commands. When the computer program is executed by one or more processors of a computer system, the computer program allows the one or more processors to perform the following operations. The operations may include an operation of determining synchronization of a materialized view present in a second database server which is remotely located from the first database server, in which the materialized view refers to a master table present in the first database server and the first database server and the second database server are heterogeneous; an operation of generating a synchronization command to be transmitted to the second database server in response to determination of the synchronization; and an operation of transmitting the generated synchronization command to the second database server to allow the second database server to synchronize the materialized view present in the second database server and the master table present in the first database server.

Another exemplary embodiment of the present invention provides a computer program stored in a computer readable medium including encoded commands. When the computer program is executed by one or more processors of a computer system, the computer program allows the one or more processors to perform the following operations. The operations may include: an operation of receiving a synchronization command from a first database server which is remotely located from the second database server in which there is a master table in the first database server, there is a materialized view which refers to the master table, in the second database server, and the first database server and the second database server are heterogeneous; and an operation of performing synchronization between the materialized view present in the second database server and the master table present in the first database server, in response to the received synchronization command.

According to an exemplary embodiment of the present invention, query results between heterogeneous databases may be efficiently synchronized.

According to an exemplary embodiment of the present invention, fast refresh of a materialized view between heterogeneous databases which are not compatible with each other may be achieved.

BRIEF DESCRIPTION OF THE DRAWINGS

Various aspects will be described with reference to the drawings and like reference numerals collectively designate like elements. In the following exemplary embodiments, a plurality of specific details will be suggested for more understanding of one or more aspects for the purpose of description. However, it will be apparent that the aspect(s) will be embodied without having the specific details. In other examples, known structures and devices will be illustrated as a block diagram to easily describe the one or more aspects.

DETAILED DESCRIPTION

Figure 1:
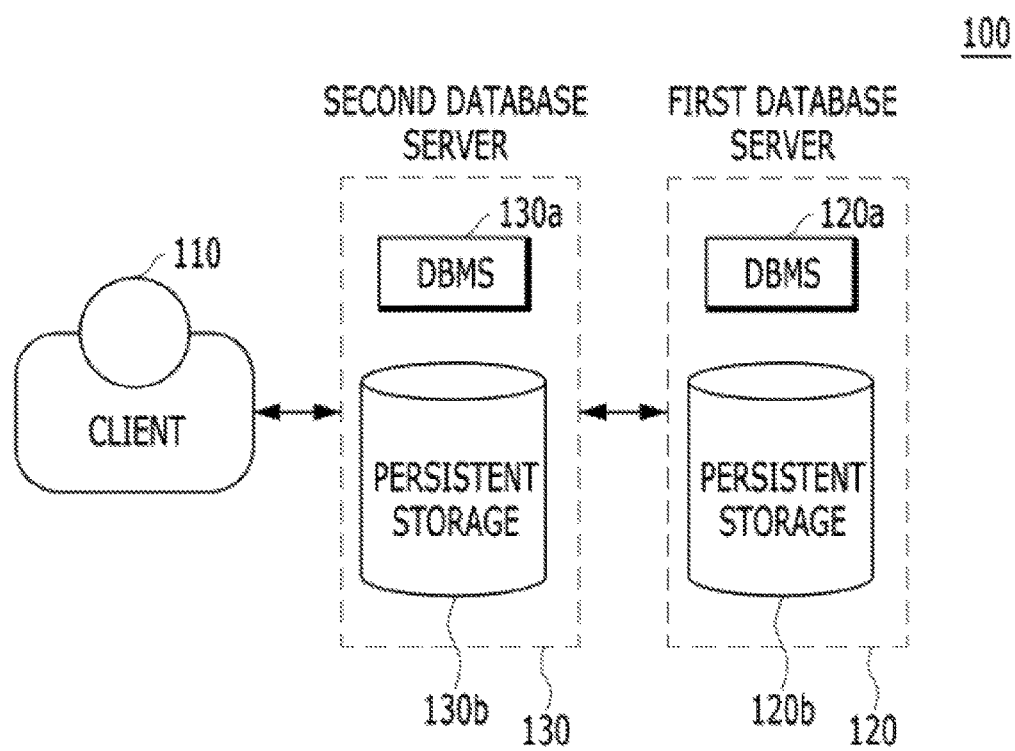
FIG. 1 illustrates a schematic view of a database system according to an exemplary embodiment of the present invention.

Various exemplary embodiments and/or aspects will be disclosed with reference to the drawings. For the purpose of description, various specific details will be disclosed for more understanding of one or more aspects. Those skilled in the art may recognize that the aspect(s) may be embodied without the specific details. The following description and accompanying drawings describe specific exemplary aspects of one or more aspects in detail. However, the aspects are illustrative and a part of the various methods of the principles of the various aspects may be used and the description is intended to include the aspects and equivalents thereof.

Various aspects and features may be suggested by a system which includes a large number of devices, components and/or modules. It should be understood and recognized that the various systems include additional devices, components and/or modules and/or do not include all the devices, components, and modules which are discussed with reference to the drawings.

It may not be interpreted that arbitrary aspect or design of exemplary embodiments", "example", "aspect", or "instance" used in this specification is better than other aspects or designs or has an advantage. A terminology which will be used below, such as a "component", a "module", a "system", or an "interface" generally refers to a computer related entity and for example, refers to hardware, software, or a combination of hardware and software.

The term "or" is intended to refer to not exclusive "or", but inclusive "or". That is, when it is not specified otherwise or is unclear in the context, "X uses A or B" is intended to mean one of natural inclusive substitutions. That is, when X uses A; X uses B; or X uses both A and B, "X uses A or B" may be applied to any of the above instances. Further, it should be understood that the term "and/or" used in this specification designates and includes all available combinations of one or more items among listed related items.

It should be understood that the term "include" and/or "including" means presence of the feature and/or the constituent elements, but does not exclude presence or addition of one or more other features, constituent elements and/or these groups. Further, when not separately specified otherwise or not clear from the context to indicate a singular form, the singular form in the specification and the claims is interpreted to represent "one or more".

A computer readable medium in the specification may include any kinds of storage in which a program and data is stored to be read by a computer system. According to an aspect of the present invention, the medium may include a read only memory (ROM), a random access memory (RAM), a compact disc (CD)-ROM, a digital versatile disk (DVD)-ROM, a magnetic tape, a floppy disk, or an optical data storage device or a medium which is implemented in the form of a carrier wave (for example, transmission through an Internet). Further, the medium is distributed to systems connected through a network and stores computer readable codes and/or commands in a distributed manner.

Prior to description of specific contents for embodying the present invention, it should be noted that a configuration which is not directly related with a technical gist of the present invention is omitted without departing from the technical gist of the present invention. Further, a terminology or a word used in this specification and the claims is interpreted as a meaning or a concept which complies with a technical spirit of the present invention based on a principle that an inventor may define an appropriate concept of the term in order to describe the invention by the best method.

FIG. 1 illustrates a schematic view of a database system 100 according to an exemplary embodiment of the present invention.

As illustrated in FIG. 1, a database system 100 includes a client 110, a first database server 120, and a second database server 130.

As illustrated in FIG. 1, the client 110 refers to a node (nodes) in a database system having a mechanism to perform communication through a network. For example, the client 110 may include a PC, a laptop computer, a workstation, a terminal and/or an arbitrary electronic device having network connectivity. Further, the client 110 may include an arbitrary server which is implemented by at least one of an agent, an application programming interface (API), and a plug-in. For example, the client 110 in FIG. 1 may be related with a user who uses the second database server 130. In this example, the client 110 may confirm a materialized view which refers to a table in the first database server 120 through the second database server 130.

The database servers 120 and 130 may include an arbitrary type of computer system or computer device such as a microprocessor, a main frame computer, a digital single processor, a portable device, and a device controller. The database servers 120 and 130 include database management systems (DBMS) 120*a* and 130*a* and persistent storages 120*b* and 130*b*, respectively. The first database server 120 and the second database server 130 may refer to heterogeneous database servers which are remotely located from each other. Further, even though two database servers are illustrated in FIG. 1, it is obvious to those skilled in the art that more database servers may also be included in the scope of the present invention.

Even though not illustrated in FIG. 1, the database servers 120 and 130 may include one or more memories including a buffer cache. Further, even though not illustrated in FIG. 1, the database servers 120 and 130 may include one or more processors. Therefore, the DBMS 120*a* and 120*b* may operate by the processor in the memory.

Here, the memory may refer to a volatile storage device which is a main storage device directly accessed by the processor and in which stored information is instantly erased when the power is turned off, such as a random access memory (RAM) including a dynamic random access memory (DRAM) and a static random access memory (SRAM), but is not limited thereto. The memory may operate by a processor. The memory may temporarily store a data table including a data value. The data table includes a data value and in an exemplary embodiment of the present invention, the data value of the data table may be recorded in the persistent storage from the memory. In an additional aspect, the memory includes a buffer cache and data may be stored in a data block of the buffer cache. The data may be recorded in the persistent storage by a background process.

The persistent storages 120*b* and 130*b* refer to non-volatile storages which consistently stores arbitrary data, such as a magnetic disk, an optical disk, and a magneto-optical storage device and a storage device based on a flash memory and/or a battery-backup memory. The persistent storages 120*b* and 130*b* may communicate with a processor and a memory of the database servers 120 and 130 through various communication units. In an additional exemplary embodiment, the persistent storages 120*b* and 130*b* are located outside the database servers 120 and 130 to communicate with database servers 120 and 130.

The DBMS 120*a* and 130*a* are programs for allowing operations of retrieving, inserting, modifying and/or deleting data required for the database servers 120 and 130 and as described above, may be implemented by processors in the memories of the database servers 120 and 130.

The client 110, the database servers 120 and 130 or the database servers 120 and 130 may communicate with each other through a network (not illustrated). A network according to an exemplary embodiment of the present invention uses various wired communication systems such as a public switched telephone network (PSTN), an x-digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

A network suggested in this specification uses various wireless communication systems such as code division multiple access (CDMA), time division multiple access (TDMA), frequency division multiple access (FDMA), orthogonal frequency division multiple access (OFDMA), single carrier-FDMA (SC-FDMA), and other systems. Further, the network in this specification may include a database link (dblink) and thus the first database server 120 and the second database server 130 may communicate with each other through the database link to import data from another database server. For example, the database link may include a database link from the first database server 120 to the second database server 130. The techniques described in this specification may be used not only in the above-mentioned networks, but also in other networks.

As illustrated in FIG. 1, the first database server 120 may be remotely located from the second database server 130. Further, the first database server 120 and the second database server may refer to heterogeneous database servers which are not compatible with each other. One (for example, the first database server 120) of the database servers includes a master table (that is, a table included in a FROM clause used in a query) and the other database server (for example, the second database server 130) includes a materialized view (a table in which a query result is stored) for the master table. The materialized view may be used to be compatible with a materialized view table, Mview or a container table.

Query result synchronization (refresh) in this specification may refer to reflection of a result of materialized view query to the materialized view table. Such a reflection method includes a complete refresh method through which contents of the materialized view table is emptied and an entire query result is inserted and a fast refresh method through which only a changed matter diff of the master table is changed. For example, when large size data is processed, as compared with the fast refresh method, since the complete refresh method requires a long processing time, generally the fast refresh method is desirable.

As illustrated in FIG. 1, since the first and second database servers are heterogeneous and remotely located from each other, there may be difficulty in implementing synchronization (that is, refresh) of the query results. That is, in the fast refresh method, in order to reflect the change in the table (that is, the master table) included in the FROM clause used in the query to the table (that is, the materialized view) in which the query result is stored, a heterogeneous server which is remotely located needs to interpret metadata included in log tables in which changed contents in the master table are stored. However, it is actually difficult to share a coding regulation, an authority regulation, a communication regulation, and an encryption regulation between database servers which are independently manufactured by different manufacturers. Therefore, instead of the above-described fast refresh method of the materialized view between the heterogeneous database servers, a method (that is, a complete refresh method) which deletes all data of the materialized view table and re-performs a query related with the materialized view to insert all the entire result data of the query in the materialized view table may be available. However, according to this method, it takes an excessive time to process the large size data and the performance of the database server is adversely affected.

Figure 2:
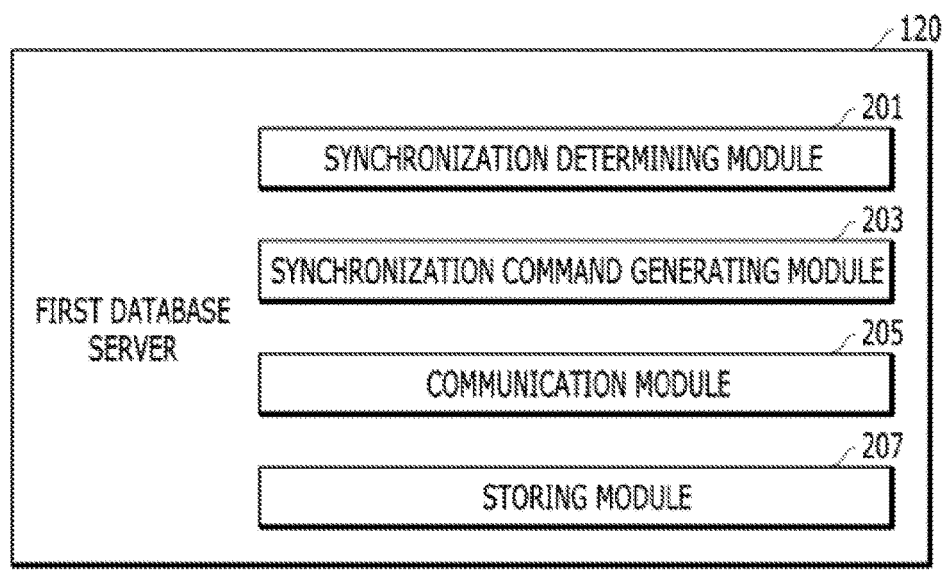
FIG. 2 illustrates a schematic view of a first database server according to an exemplary embodiment of the present invention.

FIG. 2 illustrates a schematic view of the first database server 120 according to an exemplary embodiment of the present invention.

As illustrated in FIG. 2, the first database server 120 includes a synchronization determining module 201, a synchronization command generating module 203, a communication module 205, and a storing module 207. Individual modules in the first database server 120 may communicate with each other. Further, for example, the above-described components of the first database server 120 may be included in the DBMS 120a. Further, the above-described components of the first database server 120 are illustrative and additional components other than the above-described components may also be included in the first database server 120.

The synchronization determining module 201 may determine synchronization of a materialized view present in the second database server which is remotely located from the first database server. For example, the synchronization determining module 201 may determine whether to perform synchronization based on at least one of a synchronization request from the client 110, a synchronization request from the second database server 130, a predetermined synchronization cycle, and a situation (for example, when commit is generated) when data of the master table is changed. For example, the synchronization determining module 201 checks a log table set of the first database server 120 to determine whether data in the master table is changed. When the data is changed, the synchronization determining module 201 may determine to perform synchronization. Further, when it is determined that the data is not changed in the master table, the synchronization determining module 201 may determine not to perform synchronization.

The synchronization command generating module 203 generates a synchronization command to be transmitted to the second database server 130, in response to the determination to perform synchronization. For example, the synchronization command generating module 203 obtains metadata including connection information to access a materialized view present in the second database server 130, from a materialized view object present in the first database server 120. The materialized view object may refer to a materialized view of the second database server 130. The synchronization command generating module 203 generates a synchronization command to be transmitted to the second database server 130, based on the obtained metadata. The metadata herein may include, for example, query information on the materialized view, database link information for communication between the first and second databases, and/or name information of the materialized view table. In an exemplary embodiment of the present invention, the synchronization command generated by the synchronization command generating module 203 may include a command for inserting log information in the log table set which is present in the first database table and is related with the master table into a second materialized view log table present in the second database. Further, the synchronization command may include information for procedure call to the second database server 130.

The communication module 205 may provide a communication function with the second database server 130 or the client 110. For example, the communication module 205 may transmit the generated synchronization command to the second database server 130. Further, the communication module 205 uses an arbitrary network and/or database link which have been described above to communicate with the second database server 130 or the client 110. Further, the communication module 205 receives a request for storing or retrieving data and building and retrieving an index from a client who uses the first database server 120. Further, the communication module 205 may transmit result information for the request for storing or retrieving data and building or retrieving an index. Furthermore, the communication module 205 calls a procedure to the second database server 130 to transmit the synchronization command to the second database server 130.

The storing module 207 includes the materialized view object, the master table, and the log table set. The storing module 207 stores all data which are stored in regard to performing a task of the first database server 120. The storing module 207 may be included in the DBMS 120a and/or the persistent storage 120b. Additionally, the storing module 207 may generate a master table, a materialized view object, a first materialized view log table, a DD-SLOG table, and a DD_MLOG table on the first database server 120. As another example, the tables may be generated by a separate component such as a control module (not illustrated). Further, the storing module 207 may process or manage a request related with storing (including updating) the data. The storing module 207 may determine to store the data and the index table. Further, the storing module 207 may determine a storing location of the data and/or the index table. For example, the storing module 207 may determine a storing location of the data on the data table. As still another example, the storing module 207 may determine a storing location of the data on the persistent storage 130a.

Figure 3:
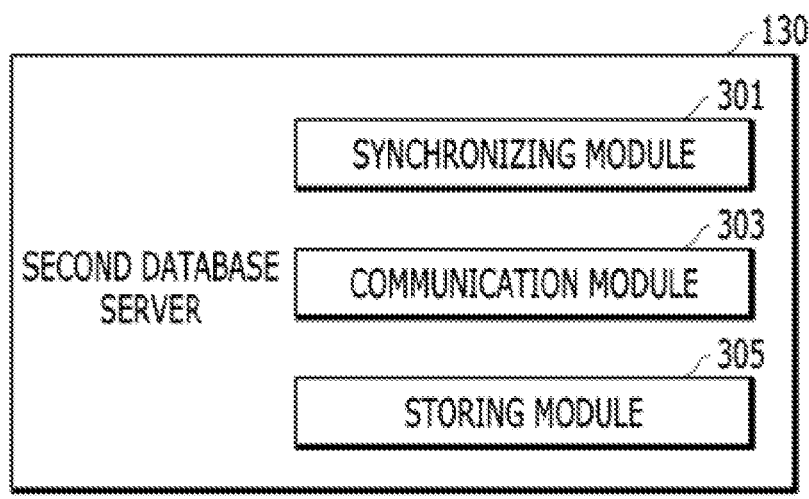
FIG. 3 illustrates a schematic view of a second database server according to an exemplary embodiment of the present invention.

FIG. 3 illustrates a schematic view of the second database server 130 according to an exemplary embodiment of the present invention.

As illustrated in FIG. 3, the second database server 130 includes a synchronizing module 301, a communication module 303, and a storing module 305. Individual modules in the second database server 130 may communicate with each other. Further, for example, the above-described components of the second database server 130 may be included in the DBMS 130*a*. Further, the above-described components of the second database server 130 are illustrative and additional components other than the above-described components may also be included in the second database server 130.

The synchronizing module 301 may perform synchronization (fast refresh) between the materialized view and the master table in response to the synchronization command received from the first database server 120. For example, the synchronizing module 301 inserts log information in the log table set which is present in the first database server 120 and is related with the master table into the second materialized view log table which is present in the second database server 130. Further, the synchronizing module 301 may perform a join operation between the second materialized view log table including the inserted log information and the materialized view table to perform synchronization. Further, the synchronizing module 301 may generate the second materialized view log table and the materialized view table on the second database server 130. As another example, the tables may be generated by a separate component such as the storing module 305 and/or a control module (not illustrated).

The communication module 303 may provide a communication function with the first database server 120 or the client 110. For example, the communication module 303 may receive the synchronization command from the first database server 120. Further, the communication module 303 uses an arbitrary network and/or database link which have been described above to communicate with the first database server 120 or the client 110. Further, the communication module 303 receives a request for storing or retrieving data and building and retrieving an index from a client who uses the second database server 130. Further, the communication module 303 may transmit result information for the request for storing or retrieving data and building or retrieving an index and the performed synchronization. Further, the communication module 303 may receive the procedure call from the first database server 120.

The storing module 305 includes the materialized view table and the second materialized view log table. The storing module 305 stores all data which are stored in regard to performing a task of the second database server 130. The storing module 305 may be included in the DBMS 130*a* and/or the persistent storage 130*b*. Further, the storing module 305 may process or manage a request related with storing (including updating) of the data. The storing module 305 may determine to store the data and the index table. Further, the storing module 305 may determine a storing location of the data and/or the index table. For example, the storing module 305 may determine a storing location of the data on the data table. As still another example, the storing module 305 may determine a storing location of the data on the persistent storage 130*b*.

Figure 4:
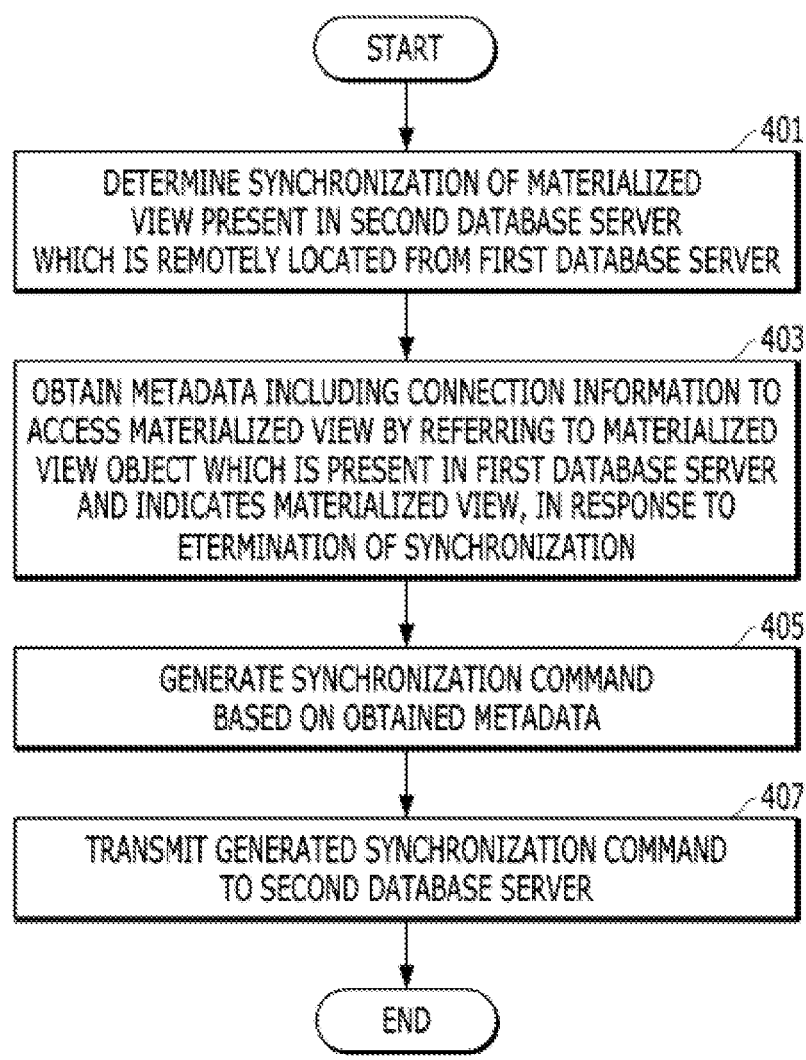
FIG. 4 illustrates a flowchart for synchronizing query results between databases executed in a first database server according to an exemplary embodiment of the present invention.

FIG. 4 illustrates a flowchart for synchronizing query results between databases executed in the first database server 120 according to an exemplary embodiment of the present invention.

Sequences of the flowchart illustrated in FIG. 4 may vary as it is implemented and some sequences may be added or some sequences may be omitted.

As illustrated in FIG. 4, a first database server 120 may determine synchronization of a materialized view present in a second database server 130 which is remotely located from the first database server 120 in step 401. In one exemplary embodiment of the present invention, the first database server 120 may determine whether to perform synchronization based on at least one of a synchronization request from the client 110, a synchronization request from the second database server 130, a predetermined synchronization cycle, and a situation when data of the master table is changed. Further, the first database server 120 checks a log table set of the first database server 120 to determine whether data in the master table is changed. For example, the first database server 120 may determine whether data is changed in a master table after a latest synchronization time in consideration of time information on previous (latest) synchronization time. When the data is changed, the first database server 120 may determine to perform synchronization. Further, when it is determined that the data is not changed in the master table, the first database server 120 may determine not to perform synchronization. When it is determined to perform synchronization, the first database server 120 may change the youngest last refresh time of the materialized view included in the DD_MLOG table in the log table set into a present time (that is, sysdata). In an additional exemplary embodiment, the determination whether to perform synchronization in the first database server 120 may be performed after calling a procedure to the second database server 130.

In one exemplary embodiment of the present invention, the first database server 120 may obtain metadata which refers to the materialized view object present in the first database server 120 and includes connection information to access the materialized view in step 403 and generate a synchronization command to be transmitted to the second database server 130 in response to the determination to perform synchronization in step 405. A materialized view object indicating a materialized view present in the second database server 130 may be generated in the first database server 120. The materialized view object in the present invention may include, for example, a separate table in which metadata related with the materialized view is stored. The materialized view object may include metadata such as query information on the materialized view, database link information for communication between the first and second databases, and/or name information of the materialized view table. Generally, since the materialized view object, which is located in a location (for example, the second database server 130) where the materialized view is located, is located on the first database server 120, the first database server 120 having the master table controls the second database server 130 having the materialized view, so that fast refresh may be implemented between heterogeneous database servers. That is, not the second database server 130 which is used by the client 110 who wants to watch the materialized view generate the synchronization command, but the first database server 120 having the master table which is actually referred by the materialized view uses the materialized view object which is owned by the first database server 120 to generate the synchronization command. In other words, the materialized view object on the first database server 120 is located, so that the materialized view object refers to the log table set (for example, the DD_SLOG table and/or the DD_MLOG table) located in the first database server 120 to determine whether to perform synchronization and/or generate the synchronizing command on the first database server 120. A principal agent which generates a logic of the fast refresh is the first database server 120 and an actual storage location of the materialized view is the second database server 130. Therefore, a problem in that fast refresh between heterogeneous DBs is impossible because the second database server 130 does not interpret the log table set of the first database server 120 which is heterogeneous from the second database server may be solved.

For example, the synchronization command may include a procedure call to the second database server 130. The procedure herein may be stored in the second database server 130 and interpret and perform the synchronization command (for example, a SQL sentence) issued from the first database server 120. Further, the synchronization command may include connection information to access the materialized view. The synchronization command may include a database manipulation language (DML) to control the second database server 130 (for example, INSERT INTO CONT_TBL@DBLINK). That is, the synchronization command may include a command for inserting log information in the log table set which is present in the first database server 120 and is related with the master table into the second materialized view log table which is present in the second database server 130 or the materialized view table (that is, the container table).

Thereafter, the first database server 120 transmits the generated synchronization command to the second database server 130 to allow the second database server 130 to perform the fast refresh in step 407.

When the synchronization is completely performed, the first database server 120 changes a last synchronization time in the DD_SLOG table into the present time, changes the youngest last refresh time and the oldest last refresh time information in the DD_MLOG table, and removes unnecessary changed data from the first materialized view log table. For example, when a completion message from the second database server 130 is received or the first database server 120 transmits the synchronization command to the second database server 130, it is determined that the synchronization is completed.

Figure 5:
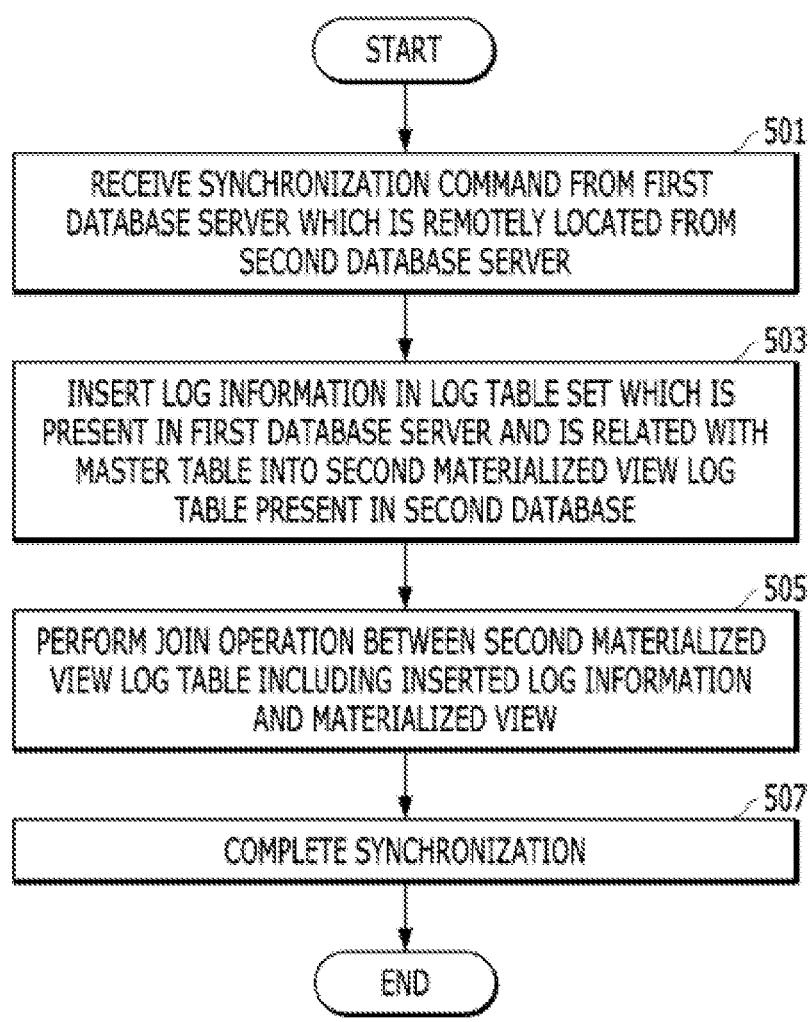
FIG. 5 illustrates a flowchart for synchronizing query results between databases executed in a second database server according to an exemplary embodiment of the present invention.

FIG. 5 illustrates a flowchart for synchronizing query results between databases executed in the second database server 130 according to an exemplary embodiment of the present invention.

Sequences of the flowchart illustrated in FIG. 5 may vary as it is implemented and some sequences may be added or some sequences may be omitted.

As illustrated in FIG. 5, a second database server 130 may receive a synchronization command from a first database server 120 which is remotely located from the second database server 130 in step 501.

The second database server 130 generates a temporary table (that is, a second materialized view log table) having a schema which is the same as or similar to the first materialized view log table of the first database server 120.

Thereafter, the second database server 130 may insert log information in the log table set which is present in the first database server 120 and is related with the master table into a second materialized view log table present in the second database server 130 in step 503. Before the inserting step, the second database server 130 may generate the second materialized view log table on the second database server 130. For example, the second materialized view log table may refer to a temporary table to join with the materialized view table.

Thereafter, the second database server 130 performs a join operation between the second materialized view log table including the inserted log information and the materialized view table to perform a synchronization operation in step 505.

In one exemplary embodiment of the present invention, the second database server 130 performs fast refresh using a DML received from the first database server 120. That is, it is considered that the materialized view table present in the second database server 130 is moved to the first database server 120 and then the log table set in the first database server 120 joins with the materialized view table. However, since a capacity of the materialized view table is much larger than a log related table, it is desirable to perform the join operation with the materialized view table in the second database server 130 after importing the log information in the log table set (for example, the DD_MLOG table and/or the DD_SLOG table) present in the first database server 120 to the second database server 130.

That is, general processes to implement the fast refresh may include: (1) a materialized view log setup (mview log setup) process which determine whether the refresh of the materialized view table is required because there is data which is changed from the master table), (2) a materialized view fast refresh performing process which performs DML which reflects only a changed part of the materialized view log table to the materialized view table and performs a process in accordance with a DML type (for example, DELETE, INSERT, OR UPDATE) of the master table and a materialized view query type (for example, one table, join, and aggregation), and (3) a materialized view log wrap up (mview log wrapup) process which changes a refresh time of the DD_SLOG into the present time sysdate, updates the oldest value of the DD_MLOG, and removes unnecessary data in the first materialized view log table which stores changed contents of the master table.

Therefore, according to the above-described exemplary embodiments of the present invention, since the second materialized view log table including log information for synchronizing the materialized view and the materialized view table are located in the same location (for example, the second database server 130), the materialized view log setup process and the materialized view log wrap up process may be implemented by the same manner as the general local fast refresh which has been described above. Further, in the materialized view fast refresh performing process, a DML command is issued to the second database server 130 having the materialized view table from the first database server 120 having the master table and the refresh operation is performed in the second database server 130, so that a compatibility problem between heterogeneous database servers which are remotely located is solved and the synchronization of the materialized view may be accomplished.

Figure 6:
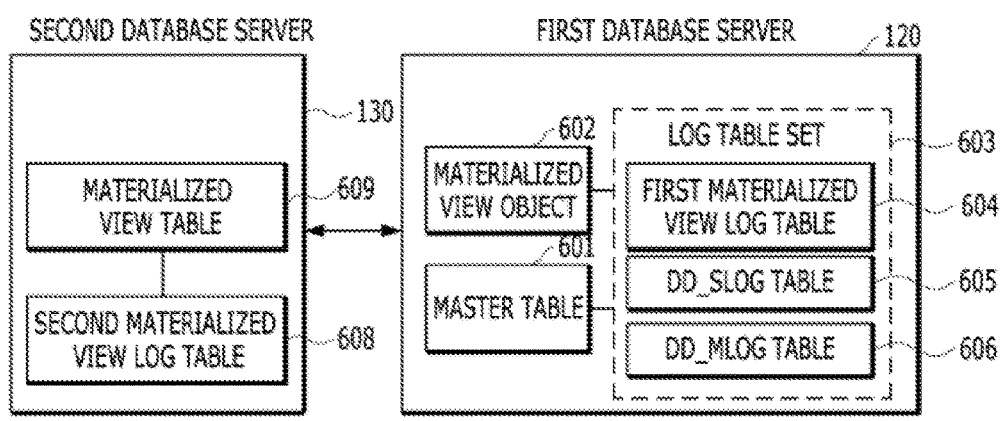
FIG. 6 illustrates a schematic view of a first database server and a second database server for synchronizing query results according to an exemplary embodiment of the present invention.

FIG. 6 illustrates a schematic view of a first database server 120 and a second database server 130 for synchronizing query results according to an exemplary embodiment of the present invention.

As illustrated in FIG. 6, the first database server 120 includes a master table 601 which is a prototype table referred by the materialized view table, a materialized view object 602 which indicates the materialized view table, a first materialized view log table 604 which monitors the master table and stores changed contents in the master table, a DD_SLOG table 605 which stores information of identifying a materialized view which refers to the master table, and a DD_MLOG table 606 which stores information on a log of the materialized view which refers to the master table. Components of the first database server 120 may be located in the memory and/or the persistent storage of the first database server 120. The master table 601 herein may be referred by a plurality of materialized view tables.

The first materialized view log table 604, the DD_SLOG table 605, and the DD_MLOG table 606 may be referred to as the log table set 603 in this specification. The DD (data dictionary) SLOG table may store at least one of information on the materialized view which refers to the master table and information on the last synchronization time for the materialized view. Further, the DD_MLOG table may store at least one of information of the youngest last refresh time and the oldest last refresh time of the last synchronization time for the materialized view. Since the materialized view object 602 is present in the first database server 120, the first database server 120 in which the master table is present may be a principal agent which manages and controls the fast refresh and the connection from the first database server 120 to the second database server 130 may be easily performed.

As illustrated in FIG. 6, the second database server 130 includes a materialized view table 609 which refers to the master table and a second materialized view log table 608 which joins with the materialized view table 609 to be used to update (that is, refresh) the materialized view table 609. Components of the second database server 130 may be located in the memory and/or the persistent storage of the second database server 130. Further, in accordance with the synchronization command from the first database server 120, log information (for example, information on a log to be reflected, time stamp information) from the DD_SLOG table 605, the DD_MLOG table 606 and/or the first materialized view log table 604 may be inserted into the second materialized view log table 608. Therefore, fast refresh of the materialized view table may be allowed by the join operation between the second materialized view log table 608 and the materialized view table 609. Further, a procedure which performs an SQL sentence issued by the first database server 120 may be stored in the second database server 130. Therefore, a principal agent which performs the fast refresh of the materialized view table may be the second database server 130.

Figure 7:
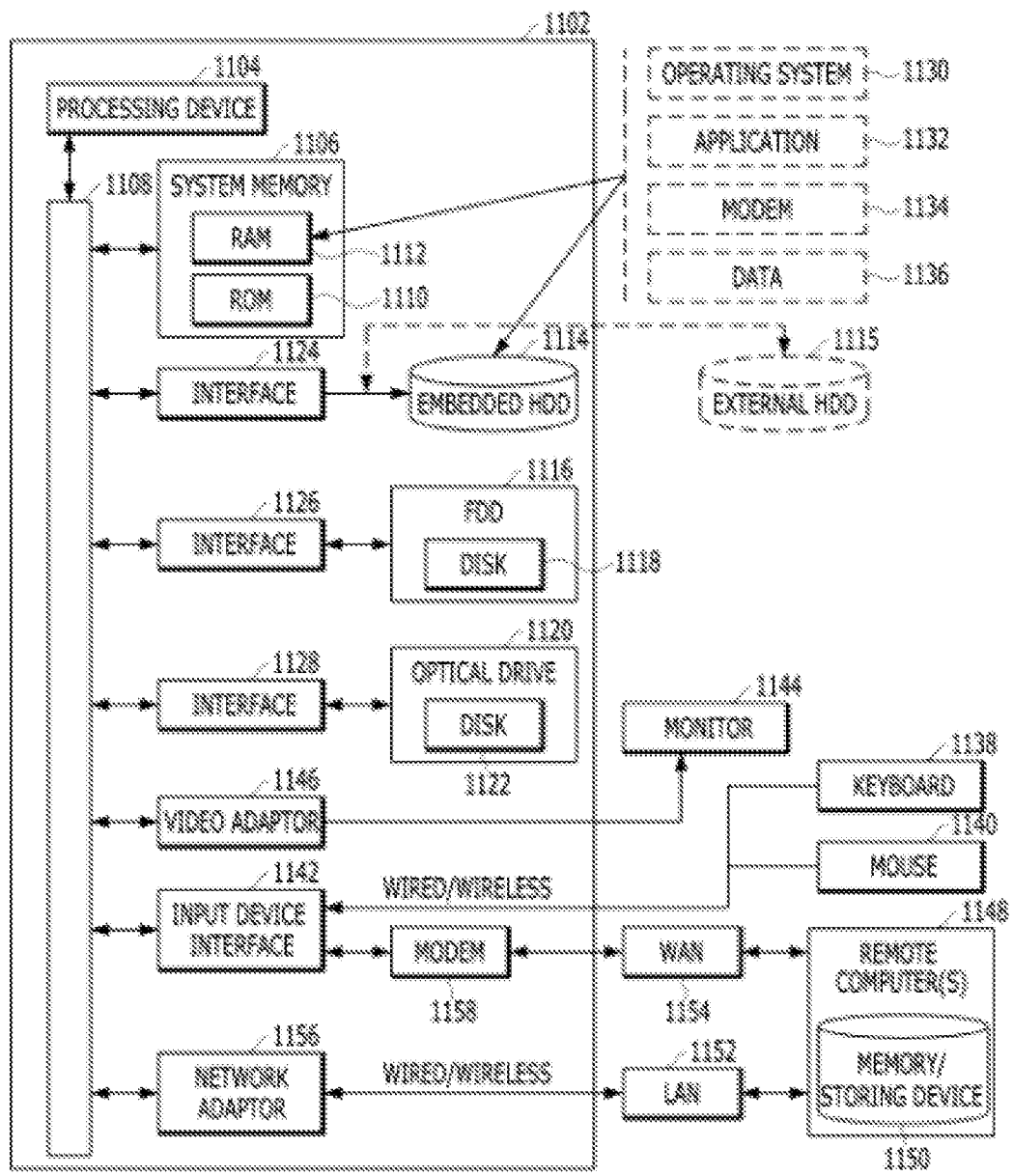
FIG. 7 illustrates a simple and general schematic view of an exemplary computing environment in which exemplary embodiments of the present invention are embodied.

FIG. 7 illustrates a simple and general schematic view of an exemplary computing environment in which exemplary embodiments of the present invention are embodied.

Even though the present invention has been described in regards to a computer executable instruction which may be generally executed on one or more computers, it is obvious to those skilled in the art that the present invention may be implemented by being coupled with other program modules and/or a combination of hardware and software.

Generally, the program module includes a routine, a program, a component, a data structure, or the like which performs a specific task or implements a specific abstract data type. Further, those skilled in the art may understand that the method of the present invention may be embodied not only by a single processor or a multi-processor computer system, a mini computer, and a main frame computer, but also a personal computer, a hand-held computing device, microprocessor based or programmable home appliances (each of which may be connected to one or more related devices to be operated), and other computer system configurations.

The described exemplary embodiments of the present invention may further be embodied in a distributed computing environment in which some tasks are performed by remote processing devices which are connected to each other through a communication network. In the distributed computing environment, a program module may be located in both local and remote memory storage devices.

Generally, a computer includes various computer readable media. If a medium is accessible by the computer, the medium may be the computer readable medium and the computer readable medium includes volatile and non-volatile media transitory and non-transitory media, and portable and non-portable media. As an example which is not limited thereby, the computer readable medium may include a computer storage and a communication medium. The computer storage medium includes volatile and non-volatile media, transitory and non-transitory media, and portable and non-portable media which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storage devices, a magnetic cassette, a magnetic tape, a magnetic disk storage device, or other magnetic storage devices, or other arbitrary media which are accessed by a computer and is used to store desired information, but is not limited thereto.

The communication medium generally implements a computer readable instruction, a data structure, a program module, or other data in a modulated data signal such as a carrier waver or other transport mechanisms and includes all information transfer media. The term "modulated data signal" refers to a signal in which one or more properties of the signal are set or changed to encode information in the signal. As an example which is not limited thereby, the communication medium includes a wired medium such as a wired network or direct wired connection and a wireless medium such as sound, RF, infrared ray, or other wireless media. It is considered that a combination of any of the above-mentioned media may also be included in the scope of the computer readable medium.

An exemplary environment 1100 including a computer 1102 which implements various aspects of the present invention is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any one of the several types of bus structures which may be additionally connected to a local bus which uses any one of a memory bus, a peripheral device bus, and various commercial bus architectures. The system memory 1106 includes a read only memory (ROM) 1110 and a random access memory RAM 1112. A basic input/output system (BIOS) is stored in a non-volatile memory 1110 such as a ROM, an EPROM, and an EEPROM and the BIOS includes a basic routine which assists to transmit information between components in the computer 1102 while the computer is activated. The RAM 1112 may include a fast RAM such as a static RAM for caching data.

The computer 1102 may include an embedded hard disk drive (HDD) 1114, 1115 (for example, EIDE, SATA) which may be configured as an external disk in an appropriate chassis (not illustrated), a magnetic floppy disk drive (FDD) 1116 (for example, to read data from a portable diskette 1118 or record data therein), and an optical disk drive 1120 (for example, to read a CD-ROM disk 1122 or read data from other high quantity optical media such as a DVD or record data therein). The hard disk drive 1114, 1115, the magnetic disk drive 1116, and the optical disk drive 1120 may be connected to the system bus 1108 through a hard disk drive interface 1124, a magnetic disk drive interface 1126, and an optical drive interface 1128, respectively. The interface 1124 for implementing an external drive includes at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable medium, an HDD, a portable magnetic disk, and a portable optical medium such as a CD or a DVD have been mentioned. However, it is well known to those skilled in the art that other computer readable type media such as a zip drive, a magnetic cassette, a flash memory card, a cartridge, or the like may also be used in the exemplary operating environment and the arbitrary medium may include a computer executable instruction which performs the methods of the present invention.

A large number of program modules including an operating system 1130, one or more application programs 1132, other program modules 1134, and program data 1136 may be stored in the drive and the RAM 1112. The operating system, the application, the module and/or all or a part of data are also cached by the RAM 1112. It is obvious that the present invention may be implemented by various commercially applicable operating systems or a combination of operating systems.

A user may input a command and information to the computer 1102 through one or more wired/wireless input devices, for example, a pointing device such as a keyboard 1138 and a mouse 1140. Other input devices (not illustrated) may include a microphone, an IR remote controller, a joystick, a game pad, a stylus pen, a touch screen, or the like. Sometimes, these and other input devices are connected to the processing device 1104 through an input device interface 1142 which is connected to the system bus 1108, but may also be connected by other interfaces such as a parallel port, an IEEE 1394 serial port, a game port, a USB port, an IR interface, or the like.

A monitor 1144 or another type of display device is also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more remote computers through wired and/or wireless communication. The remote computer(s) 1148 may be a workstation, a server computer, a router, a personal computer, a portable computer, a microprocessor based amusement machine, a peer device, or other general network nodes and generally, includes a large number of or all the components which have been described for the computer 1102. However, for the purpose of simplicity, only a memory storing device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitates enterprise-wide computer network such as intranet and all of these are connected to worldwide computer network, for example, Internet.

When the computer is used in the LAN networking environment, the computer 1102 is connected to a local network 1152 through a wired and/or wireless communication network interface or an adaptor 1156. The adaptor 1156 facilitates wired or wireless communication to the LAN 1152 and the LAN 1152 also includes a wireless access point provided therein to communicate with the wireless adaptor 1156. When the computer is used in the WAN networking environment, the computer 1102 has other means which include a modem 1158 or are connected to a communication server on the WAN 1154, or use Internet to set communication through the WAN 1154. The modem 1158 which may be an embedded or external, and wired or wireless device is connected to the system bus 1108 through the serial port interface 1142. In a networked environment, program modules described for the computer 1102 or a part thereof may be stored in the remote memory/storing device 1150. It is understood that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or a portable computer, a portable data assistant (PDA), a communication satellite, arbitrary equipment or location related with a wireless detectable tag, and a telephone. This includes at least Wi-Fi and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a,b,g, or the like) to provide safe, reliable, and fast wireless connection. Wi-Fi is used to connect computers to each other or to the Internet, and a wired network (IEEE 802.3 or Ethernet is used). The Wi-Fi network operates at a 11 Mbps (802.11a) or 54 Mbps (802.11b) data rate in an unauthorized wireless band of 2.4 and 5 GHz or operates in a product including both bands (dual band).

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software" here), a design code, or a combination thereof. In order to clearly describe compatibility of hardware and software, various exemplary components, blocks, modules, circuits, and steps have been generally described above with respect to functions thereof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present invention.

Various exemplary embodiments suggested herein may be implemented by a method, a device, or a standard programming and/or an article using an engineering technique. The term "article" includes a computer program which is accessible from an arbitrary computer readable device, a carrier or a medium. For example, the computer readable medium includes a magnetic storing device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. Further, various storage media suggested herein includes one or more devices for storing information and/or other machine readable media The term "machine readable medium" includes a wireless channel which stores, contains, and/or transmits command(s) and/or data and various other media, but is not limited thereto.

It should be understood that a specific order or a hierarchical structure of steps in suggested processes are examples of exemplary approaches. It should be understood that a specific order or a hierarchical structure of steps in the processes may be rearranged within the scope of the present invention based on design priorities. The accompanying method claims provide elements of various steps in the order of sample, but the claims are not meant to be limited to the suggested specific order or hierarchical structure.

Description of the suggested exemplary embodiment is provided to allow those skilled in the art to use or embody the present invention. Various modifications of the exemplary embodiments may be apparent to those skilled in the art and general principles defined herein may be applied to other exemplary embodiments without departing from the scope of the present invention. Therefore, the present invention is not limited to the exemplary embodiments suggested herein, but interpreted in the broadest range which is consistent with principles suggested herein and new features.

What is claimed is:

1. A method for synchronizing a materialized view between databases which are performed in a first database server, the method comprising:
    determining synchronization of a materialized view present in a second database server which is remotely located from the first database server in which the materialized view refers to a master table present in the first database server and the first database server and the second database server are heterogeneous;
    generating a synchronization command to be transmitted to the second database server in response to determination of synchronization by obtaining metadata at least including database link information for communication between the first database server and the second database server, from a materialized view object present in the first database server, wherein the synchronization command includes a command for inserting log information in a log table set which is present in the first database server and is related with the master table into a second materialized view log table present in the second database server;
    transmitting the generated synchronization command to the second database server so that the second database server performs one or more operations between the second materialized view log table including the inserted log information and the materialized view present in the second database server, thereby synchronizing the materialized view present in the second database server and the master table present in the first database server, wherein:
    the log table set includes at least one of a first materialized view log table including data changed contents of the master table; a DD (data dictionary) SLOG table which stores at least one of information on the materialized view which refers to the master table and information on a last synchronization time for the materialized view; and a DD_MLOG table which stores youngest last refresh time and oldest last refresh time information for a last synchronization time for the materialized view, and
    the determining of synchronization includes checking the log table set to determine whether data is changed in the master table; and
    determining not to perform synchronization when it is determined that the data is not changed and determining to perform synchronization when it is determined that the data is changed.

2. The method of claim 1, further comprising:
    when the synchronization is completed,
    changing the last synchronization time in the DD_SLOG table to a present time;
    changing the youngest last refresh time and oldest last refresh time information in the DD_MLOG table; and
    removing unnecessary changed data from the first materialized view log table.

3. The method of claim 1, wherein the determining of synchronization is performed based on at least one of a synchronization request from a user of the second database server, a predetermined synchronization cycle, and a situation when data of the master table is changed.

4. The method of claim 1, wherein the synchronization is fast refresh between the master table of the first database server and the materialized view of the second database server.

5. A method for synchronizing materialized view between databases which are performed in a second database server, the method comprising:
    receiving a synchronization command from a first database server which is remotely located from the second database server in which there is a master table in the first database server, there is a materialized view which refers to the master table, in the second database server, and the first database server and the second database server are heterogeneous, wherein the synchronization command is generated by obtaining metadata at least including database link information for communication between the first database server and the second database server, from a materialized view object present in the first database server; and
    in response to the received synchronization command, performing one or more operations between the second materialized view log table including inserted log information and the materialized view present in the second database server, thereby synchronizing the materialized view present in the second database server and the master table present in the first database server, wherein:
    the log table set includes at least one of a first materialized view log table including data changed contents of the master table; a DD (data dictionary) SLOG table which stores at least one of information on the materialized view which refers to the master table and information on a last synchronization time for the materialized view; and a DD_MLOG table which stores youngest last refresh time and oldest last refresh time information for a last synchronization time for the materialized view, and
    the synchronization command is received upon checking the log table set to determine whether data is changed in the master table.

6. The method of claim 5, wherein the performing of synchronization further includes performing a join operation between the second materialized view log table including the inserted log information and the materialized view.

7. A first database server which synchronizes materialized views between databases, the server comprising:

a synchronization determining module configured to determine synchronization of a materialized view present in a second database server which is remotely located from the first database server, in which the materialized view refers to a master table present in the first database server and the first database server and the second database server are heterogeneous;

a synchronization command generating module configured to generate a synchronization command to be transmitted to the second database server in response to determination of synchronization by obtaining metadata at least including database link information for communication between the first database server and the second database server, from a materialized view object present in the first database server, wherein the synchronization command includes a command for inserting log information in a log table set which is present in the first database server and is related with the master table into a second materialized view log table present in the second database server, wherein:

the log table set includes at least one of a first materialized view log table including data changed contents of the master table; a DD (data dictionary) SLOG table which stores at least one of information on the materialized view which refers to the master table and information on a last synchronization time for the materialized view; and a DD_MLOG table which stores youngest last refresh time and oldest last refresh time information for a last synchronization time for the materialized view, and to reach the determination of synchronization includes to check the log table set to determine whether data is changed in the master table, the synchronization command generating module further configured to:

determine not to perform synchronization when the data is not changed and to determine to perform synchronization when it is determined that the data is changed; and a communication module configured to transmit the generated synchronization command to the second database server so that the second database server performs one or more operations between the second materialized view log table including the inserted log information and the materialized view present in the second database server, thereby synchronizing the materialized view present in the second database server and the master table present in the first database server.

8. A second database server which synchronizes materialized views between databases, the server comprising:

a communication module configured to receive a synchronization command from a first database server which is remotely located from the second database server in which there is a master table in the first database server, there is a materialized view which refers to the master table, in the second database server, and the first database server and the second database server are heterogeneous, wherein the synchronization command is generated by obtaining metadata at least including database link information for communication between the first database server and the second database server, from a materialized view object present in the first database server, and wherein the synchronization command includes a command for inserting log information in a log table set which is present in the first database server and is related with the master table into a second materialized view log table present in the second database server; and a synchronization module configured to in response to the received synchronization command, perform one or more operations between the second materialized view log table including the inserted log information and the materialized view present in the second database server, thereby synchronizing the materialized view present in the second database server and the master table present in the first database server, wherein:

the log table set includes at least one of a first materialized view log table including data changed contents of the master table; a DD (data dictionary) SLOG table which stores at least one of information on the materialized view which refers to the master table and information on a last synchronization time for the materialized view; and a DD_MLOG table which stores youngest last refresh time and oldest last refresh time information for a last synchronization time for the materialized view, and the synchronization command is received upon checking the log table set to determine whether data is changed in the master table.

9. A computer program stored in a non-transitory computer readable medium including encoded commands, wherein when the computer program is executed by one or more processors of a computer system, the computer program allows the one or more processors to perform the following operations comprising:

an operation of determining synchronization of a materialized view present in a second database server which is remotely located from a first database server, in which the materialized view is a materialized view which refers to a master table present in the first database server and the first database server and the second database server are heterogeneous;

an operation of generating a synchronization command to be transmitted to the second database server in response to determination of synchronization by obtaining metadata at least including database link information for communication between the first database server and the second database server, from a materialized view object present in the first database server, wherein the synchronization command includes a command for inserting log information in a log table set which is present in the first database server and is related with the master table into a second materialized view log table present in the second database server;

an operation of transmitting the generated synchronization command to the second database server so that the second database server performs one or more operations between the second materialized view log table including the inserted log information and the materialized view present in the second database server, thereby synchronizing the materialized view present in the second database server and the master table present in the first database server, wherein:

the log table set includes at least one of a first materialized view log table including data changed contents of the master table; a DD (data dictionary) SLOG table which stores at least one of information on the materialized view which refers to the master table and information on a last synchronization time for the materialized view, and a DD_MLOG table which stores youngest last refresh time and oldest last refresh time information for a last synchronization time for the materialized view, and the operation of determining of synchronization includes checking the log table set to determine whether data is changed in the master table; and an operation of determining not to perform synchronization when it is determined that the data is not changed and determining to perform synchronization when it is determined that the data is changed.

10. A computer program stored in a non-transitory, computer readable medium including encoded commands, wherein when the computer program is executed by one or more processors of a computer system, the computer program allows the one or more processors to perform the following operations comprising:

an operation of receiving a synchronization command from a first database server which is remotely located from a second database server in which there is a master table in the first database server, there is a materialized view which refers to the master table, in the second database server, and the first database server and the second database server are heterogeneous, wherein the synchronization command is generated by obtaining metadata at least including database link information for communication between the first database server and the second database server, from a materialized view object present in the first database server, and wherein the synchronization command includes a command for inserting log information in a log table set which is present in the first database server and is related with the master table into a second materialized view log table present in the second database server; and an operation of in response to the received synchronization command performing one or more operations between the second materialized view log table including the inserted log information and the materialized view present in the second database server, thereby synchronizing the materialized view present in the second database server and the master table present in the first database server, wherein:

the log table set includes at least one of a first materialized view log table including data changed contents of the master table; a DD (data dictionary) SLOG table which stores at least one of information on the materialized view which refers to the master table and information on a last synchronization time for the materialized view; and a DD_MLOG table which stores youngest last refresh time and oldest last refresh time information for a last synchronization time for the materialized view, and the operation of receiving the synchronization command is executed when data is changed in the master table.

* * * * *